United States Patent
Woo et al.

(10) Patent No.: US 11,713,079 B2
(45) Date of Patent: Aug. 1, 2023

(54) CHASSIS FRAME MODULE FOR ELECTRIC VEHICLE

(71) Applicant: HYUNDAI MOBIS CO., LTD., Seoul (KR)

(72) Inventors: Hyun Jin Woo, Yongin-si (KR); Kyoung Hoon Shin, Yongin-si (KR); Hyoun Young Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/674,386

(22) Filed: Feb. 17, 2022

(65) Prior Publication Data

US 2022/0266907 A1 Aug. 25, 2022

(30) Foreign Application Priority Data

Feb. 19, 2021 (KR) .................. 10-2021-0022796
Feb. 19, 2021 (KR) .................. 10-2021-0022797

(51) Int. Cl.
*B62D 21/02* (2006.01)

(52) U.S. Cl.
CPC ................... *B62D 21/02* (2013.01)

(58) Field of Classification Search
CPC .... B62D 21/02; B62D 21/07; B62D 25/2018; B62D 25/2027; B62D 25/2036; B62D 21/17; B60K 2001/0438; B60K 1/04; B60Y 2306/01; B60Y 2410/115
See application file for complete search history.

(56) References Cited

U.S. PATENT DOCUMENTS

| 6,270,150 | B1 * | 8/2001 | Miller | B62D 21/17 296/184.1 |
| 8,596,685 | B2 * | 12/2013 | Mauduit | B62D 25/2036 296/193.07 |
| 2006/0071466 | A1 * | 4/2006 | Rowe | B62D 21/17 280/782 |
| 2017/0001586 | A1 * | 1/2017 | Ashraf | B60R 19/34 |

(Continued)

FOREIGN PATENT DOCUMENTS

| CA | 2288371 A1 * | 6/2000 | ............ B62D 21/17 |
| DE | 44 17 470 C1 | 5/1995 | |

(Continued)

OTHER PUBLICATIONS

Extended European search report dated Jul. 22, 2022, in counterpart European Patent Application No. 22157607.7 (9 pages in English).

*Primary Examiner* — Drew J Brown
*Assistant Examiner* — Matthew D Lee
(74) *Attorney, Agent, or Firm* — NSIP Law

(57) ABSTRACT

A chassis frame module for an electric vehicle may include a chassis frame including a pair of side frames, a pair of inclined frames connected to front ends of the respective side frames, respectively, and a distance between the pair of inclined frames decreases toward the front, a front frame connected to the inclined frames, and a rear frame connected to rear ends of the pair of side frames, a battery disposed between the pair of side frames, and a plurality of wire assemblies disposed between the side frame and the battery and in a longitudinal direction of the side frame, and being configured to house a wire in an internal space thereof.

19 Claims, 21 Drawing Sheets

(56) References Cited

U.S. PATENT DOCUMENTS

| | | | |
|---|---|---|---|
| 2017/0110217 A1* | 4/2017 | Oikawa | H01B 11/002 |
| 2020/0079202 A1 | 3/2020 | Suzuki | |
| 2020/0406976 A1 | 12/2020 | Shioya et al. | |
| 2020/0406978 A1* | 12/2020 | Hattori | B60K 1/04 |
| 2022/0176791 A1* | 6/2022 | Danneberg | B60K 1/04 |
| 2022/0266907 A1* | 8/2022 | Woo | B62D 21/02 |

FOREIGN PATENT DOCUMENTS

| | | | |
|---|---|---|---|
| EP | 1 939 026 A1 | | 7/2008 |
| JP | 09115612 A | * | 5/1997 |
| JP | 2013256169 A | * | 12/2013 |
| JP | 2014-101009 A | | 6/2014 |
| KR | 10-2089486 B1 | | 3/2020 |

* cited by examiner

CHASSIS FRAME MODULE FOR ELECTRIC VEHICLE

CROSS-REFERENCE TO RELATED APPLICATIONS

This application claims the benefit under 35 USC § 119(a) of Korean Patent Applications No. 10-2021-0022796, filed on Feb. 19, 2021 and No. 10-2021-0022797, filed on Feb. 19, 2021, the entire disclosure of which are incorporated herein by reference for all purposes.

BACKGROUND

1. Field

The following description relates to a chassis frame module for an electric vehicle, in which a wire assembly for containing a wire can be modularized as a unit part to follow the expandability of the specification of a vehicle.

2. Discussion of Related Art

In general, an electric vehicle refers to a vehicle which drives by using electricity as power, and acquires driving energy by rotating a motor using electricity stored in a battery.

Recently, much research has been conducted on a PVB (Purpose Built Vehicle) based on urban ecomobility, in which a user can freely use a customized service such as a cafe or hospital according to the design, while moving.

In order to modify the body of a PBV according to a user's taste, it is necessary to reduce the number of structures which are directly assembled to the bottom of the body of an existing vehicle. Therefore, the corresponding structures such as a wire need to be assembled to a chassis frame. Furthermore, the space efficiency of the vehicle needs to be maximized in order to implement the optimal platform, and the exposure to the outside needs to be minimized in order to suppress corrosion. Therefore, there is a need for a device capable of solving the problem.

The related art of the present disclosure is disclosed in Korean Patent No. 10-2089486 registered on Mar. 10, 2020 and entitled "Chassis Platform Module for Electric Vehicle."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a chassis frame module for an electric vehicle, including a chassis frame including a pair of side frames, a pair of inclined frames connected to front ends of the respective side frames, respectively, and a distance between the pair of inclined frames decreases toward the front, a front frame connected to the inclined frames, and a rear frame connected to rear ends of the pair of side frames, a battery disposed between the pair of side frames, and a plurality of wire assemblies disposed between the side frame and the battery and in a longitudinal direction of the side frame, and being configured to house a wire in an internal space thereof.

The plurality of wire assemblies may each include a cage disposed between the side frame and the battery, and in the longitudinal direction of the side frame, and a clip having one side supported by the cage and the other side connected to the side frame.

The cage may include a cage body formed in a hollow shape, and configured to house the wire in an internal space thereof, a cage holding part formed on one side of the cage body, and configured to hold a neighboring cage body, a cage insertion part formed on the other side of the cage body, and inserted into the neighboring cage body, and a lever inserted into one side of the cage holding part, and configured to expand an opening of the cage holding part.

A width of an inner surface of the cage holding part may decrease toward an inside of the cage body, and a width of an outer surface of the cage insertion part may decrease toward an outside of the cage body.

The lever may include a first lever support part supported by one surface of the cage body, a second lever support part extending from the first lever support part and being inserted into one side of the cage holding part, and a lever manipulation part extending from the second lever support part, and being configured to be pressed to turn the second lever support part to expand an opening of the cage holding part.

The cage holding part may have an insertion hole formed therein, the cage body may have a protrusion formed on an outer surface thereof, and the protrusion may be inserted into the insertion hole of a neighboring cage holding part.

The clip may include a clip body having one side supported by the cage body and the other side connected to the side frame, and a clip through part mounted on one surface of the clip body, inserted into the cage body, and being configured to support the wire.

The plurality of wire assemblies each may include a clip fitting part having one open side to surround an outer surface of the wire and the other side placed on an outer surface of the clip through part.

The wire may include a wire body inserted into an internal space of the cage body, a first wire end part mounted on one side of the wire body and having the clip fitting part mounted on an outer surface thereof, and a second wire end part mounted on the other side of the wire body and inserted into a neighboring first wire end part.

The cage may be made of a plastic material.

In another general aspect, there is provided a chassis frame module for an electric vehicle, including a chassis frame comprising a pair of side frames, a pair of inclined frames connected to front ends of the side frames, respectively, such that a distance therebetween decreases toward the front, a front frame connected to the inclined frames, and a rear frame configured to connect rear ends of the side frames, a battery disposed between the pair of side frames, and a wire assembly connected to the side frame and the battery, and being configured to contain a wire in an internal space thereof.

The wire assembly may include a wire cage having one side connected to the side frame and the other side connected to the battery, and a clip mounted in the wire cage, such that the wire is seated thereon.

The clip may be detachably mounted on the wire cage.

The clip may include a clip insertion part mounted on the wire cage, a clip rod part extended from one side of the clip insertion part, a contact surface part mounted at an end of the clip rod part, and being in contact with the wire cage, and an elastic coupling part formed on one side of the contact surface part, having a ring shape with an open side, and being elastically coupled to the wire.

The clip insertion part may be formed in an arrowhead shape whose size gradually decreases in an insertion direction to the wire cage, and being made of an elastically deformable material.

The wire cage may include a wire body having one side connected to the side frame and the other side connected to the battery, and having an internal space formed therein, and a grid part mounted in the internal space of the cage body, formed in a grid shape, and configured to divide a space in which the plurality of clips are mounted.

The wire cage may include a plurality of open observation windows formed in the cage body along the length of the cage body.

The wire cage may be made of a plastic material.

Other features and aspects will be apparent from the following detailed description, the drawings, and the claims.

Figure 1:
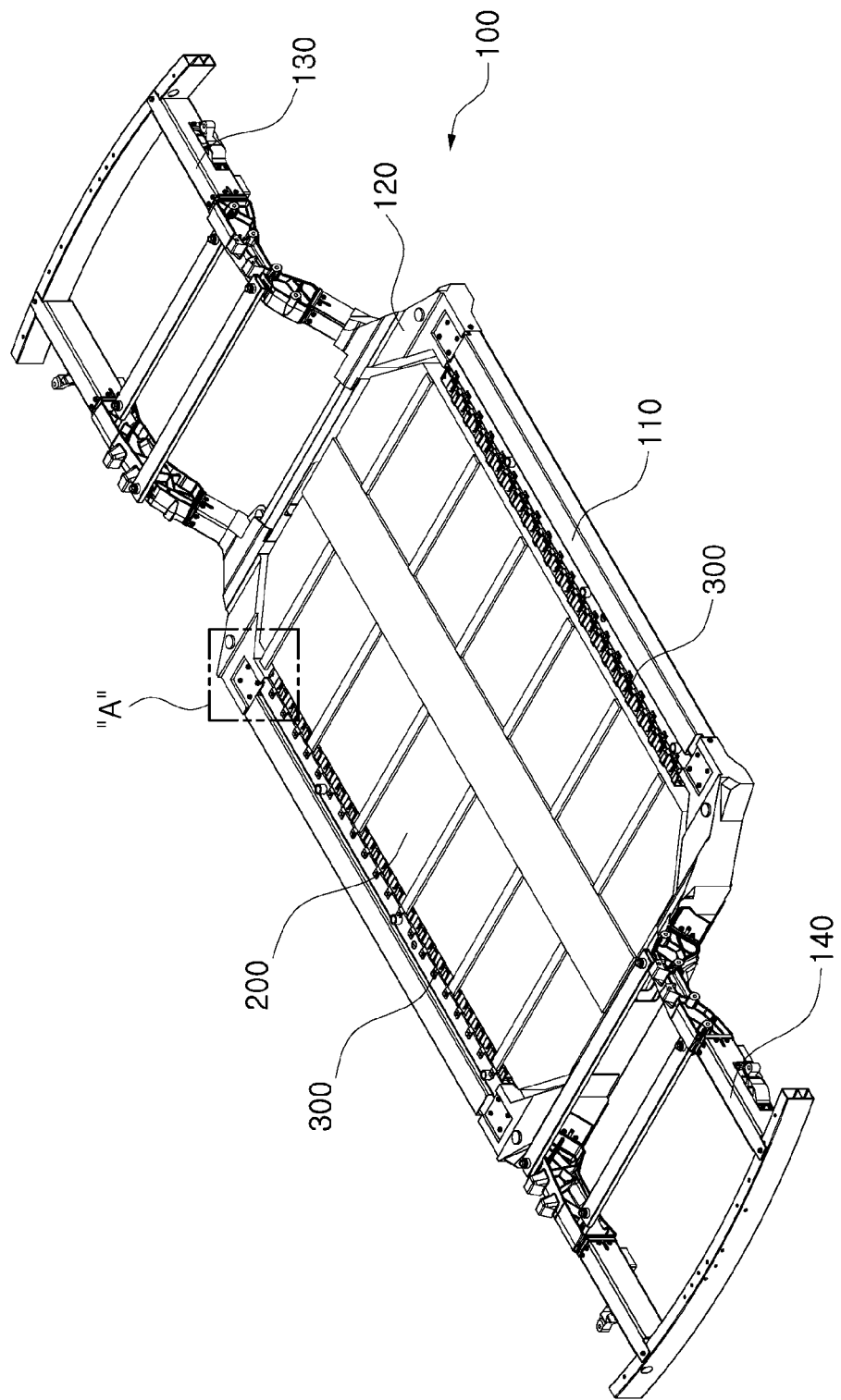
FIG. 1 is a perspective view schematically illustrating a chassis frame module for an electrical vehicle in accordance with an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Hereinafter, a chassis frame module for an electric vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 2:
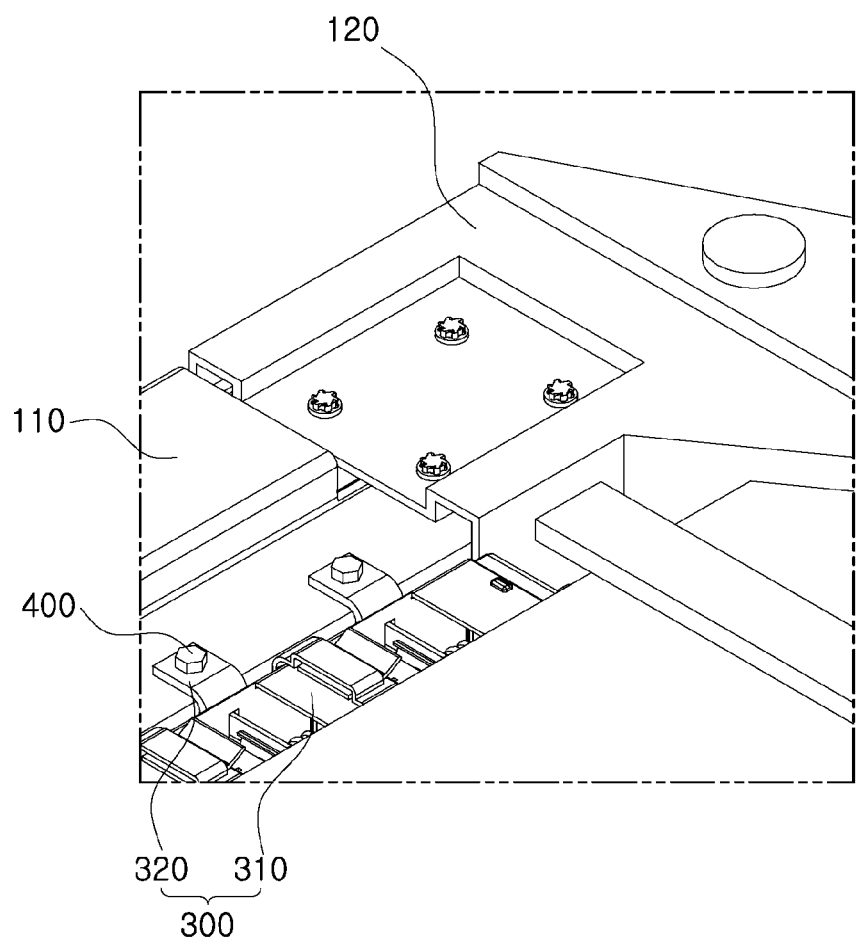
FIG. 2 is a partially expanded perspective view schematically illustrating a portion "A" of FIG. 1.
Figure 3:
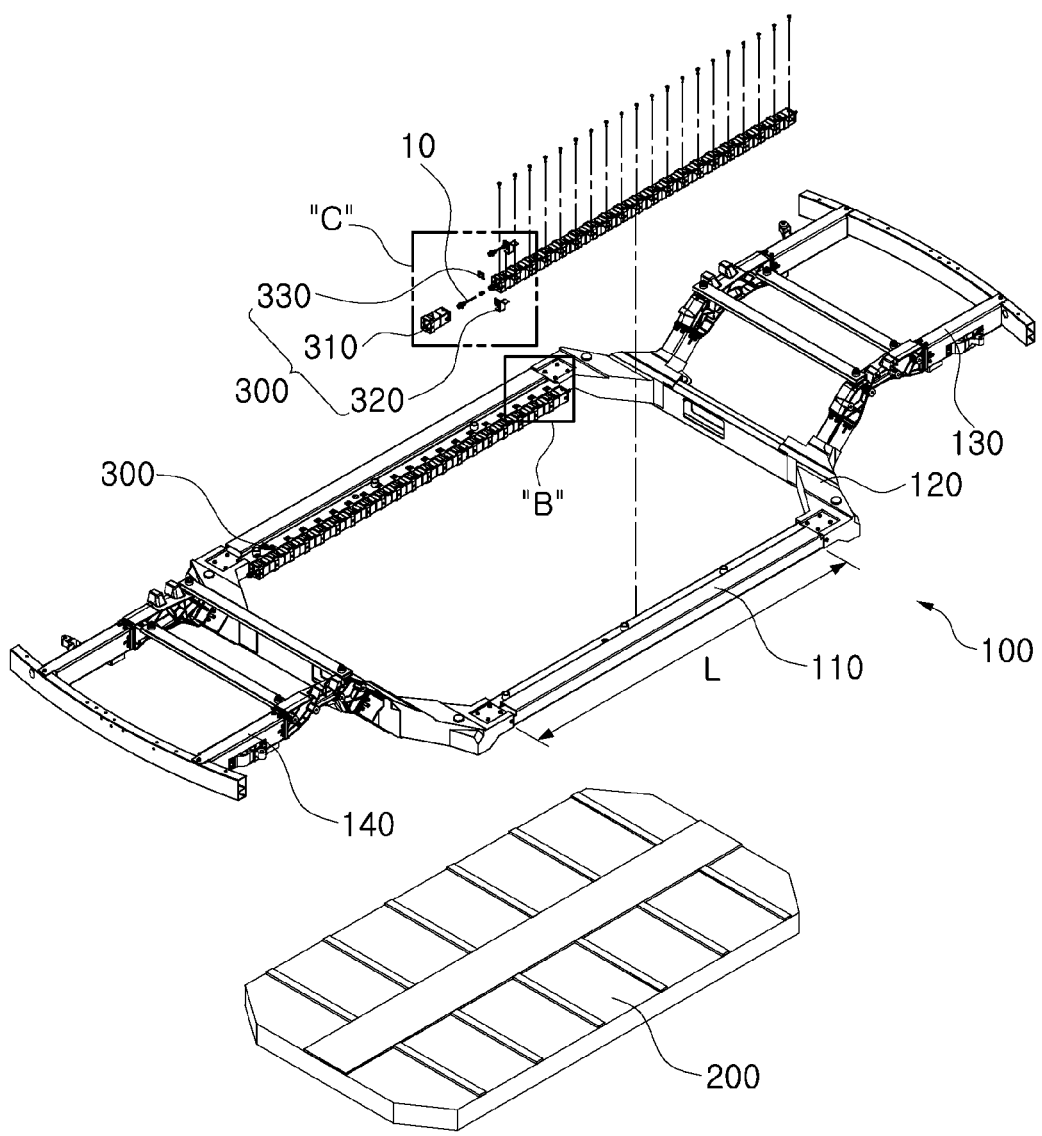
FIG. 3 is an assembled perspective view schematically illustrating the chassis frame module for an electrical vehicle in accordance with the embodiment of the present disclosure.
Figure 4:
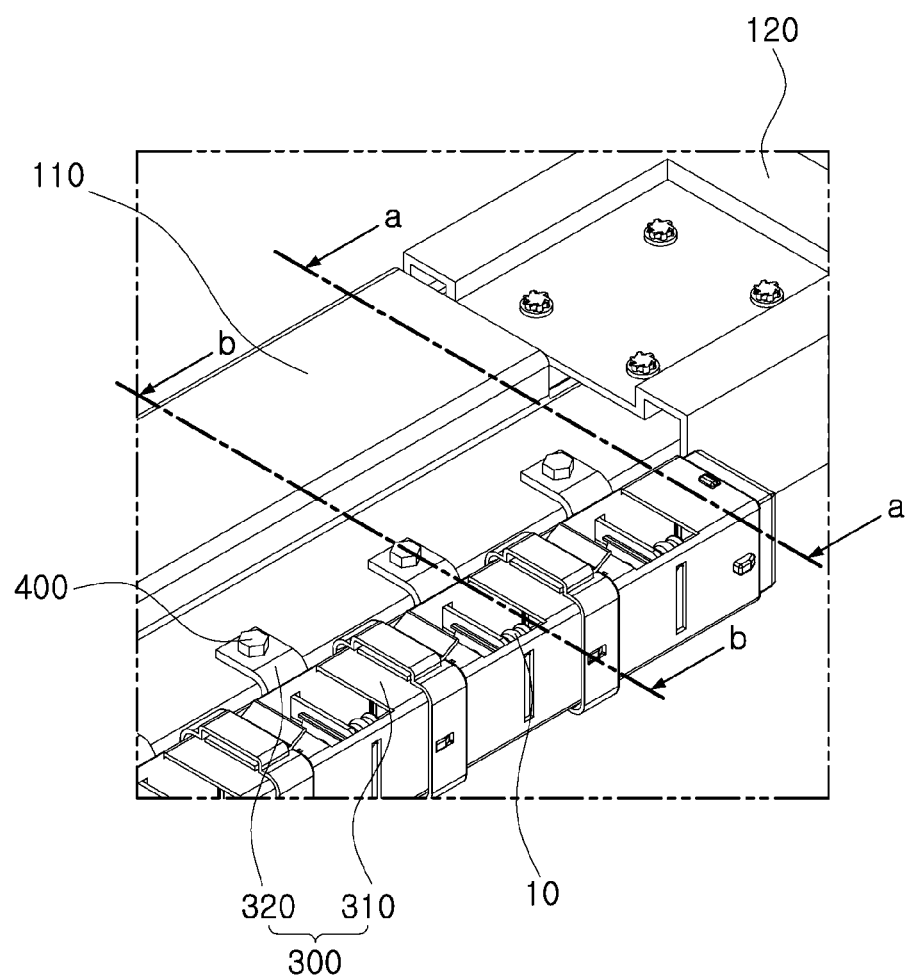
FIG. 4 is a partially expanded perspective view schematically illustrating a portion "B" of FIG. 3.
Figure 5:
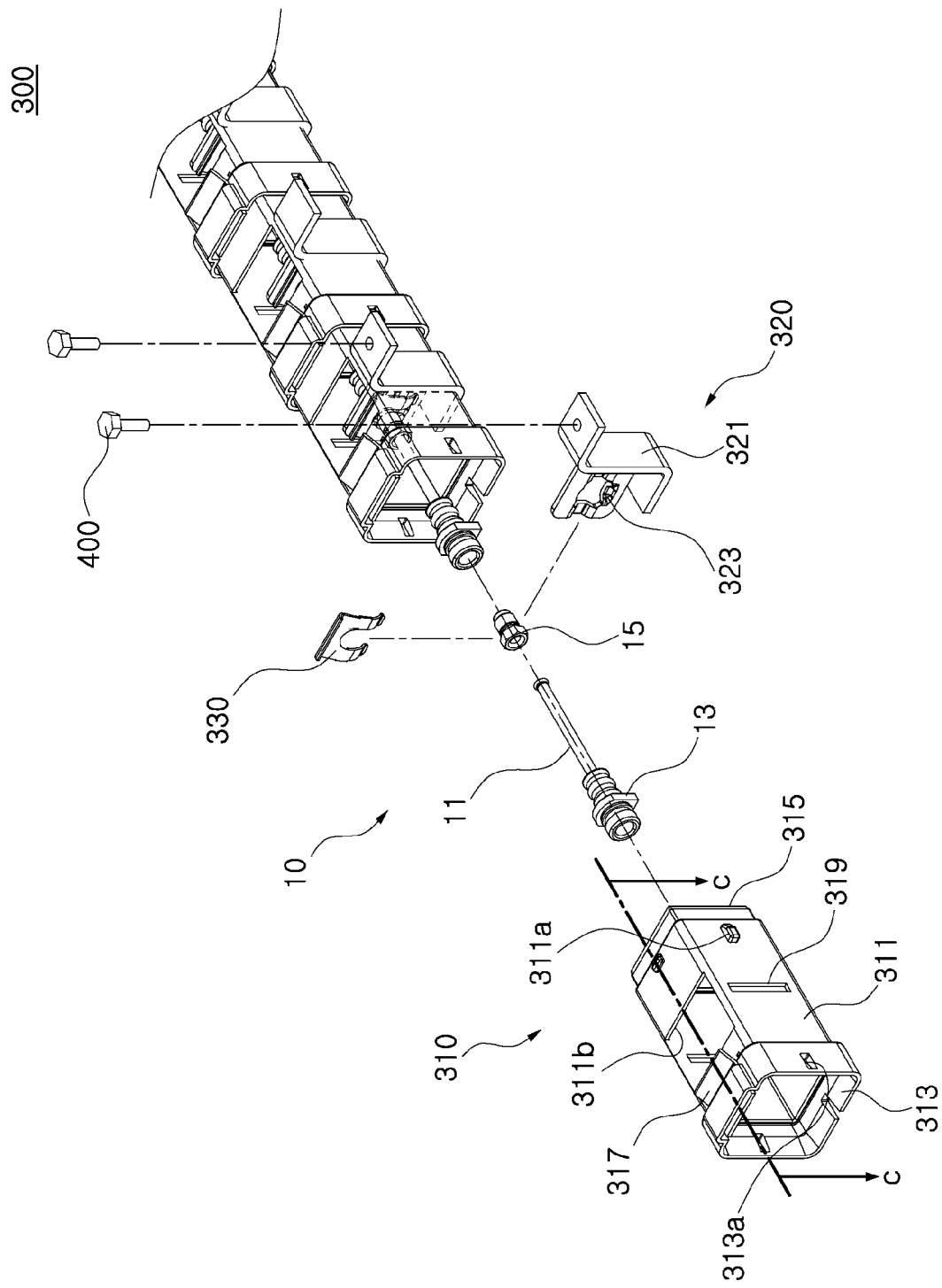
FIG. 5 is a partially expanded perspective view schematically illustrating a portion "C" of FIG. 3.
Figure 6:
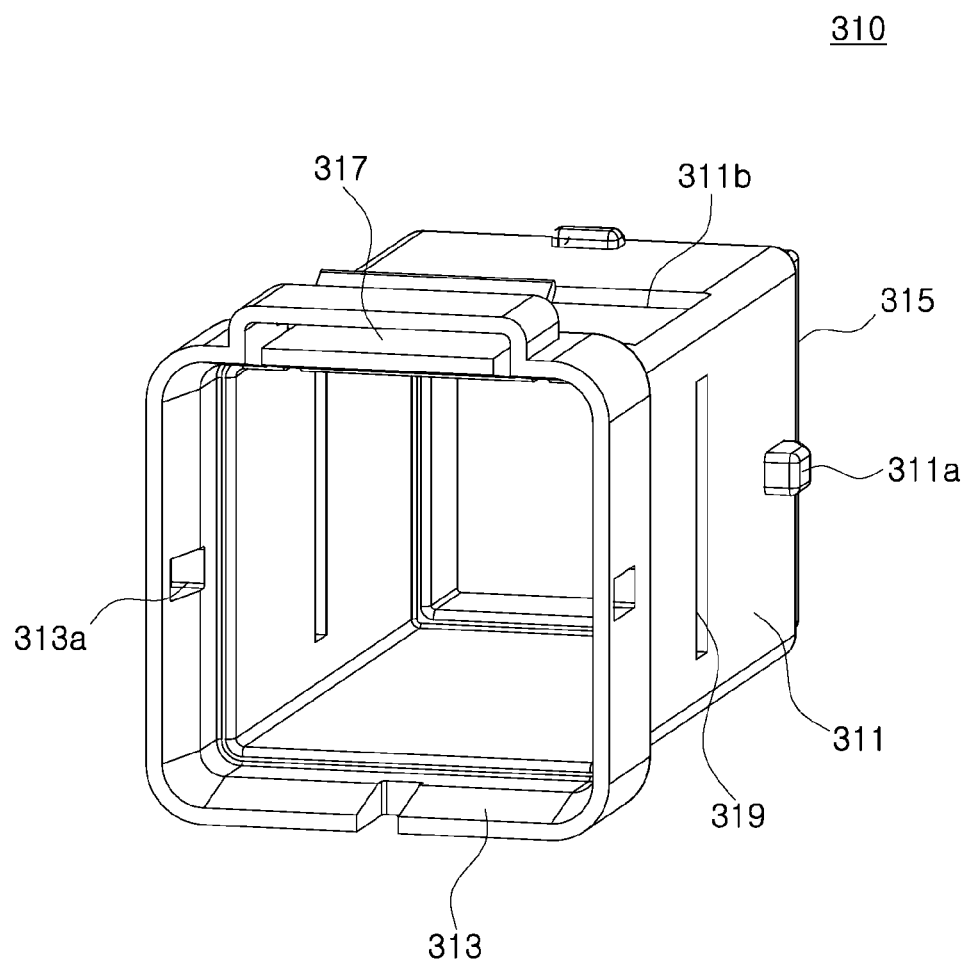
FIG. 6 is a perspective view schematically illustrating one side of a cage in accordance with the embodiment of the present disclosure.
Figure 7:
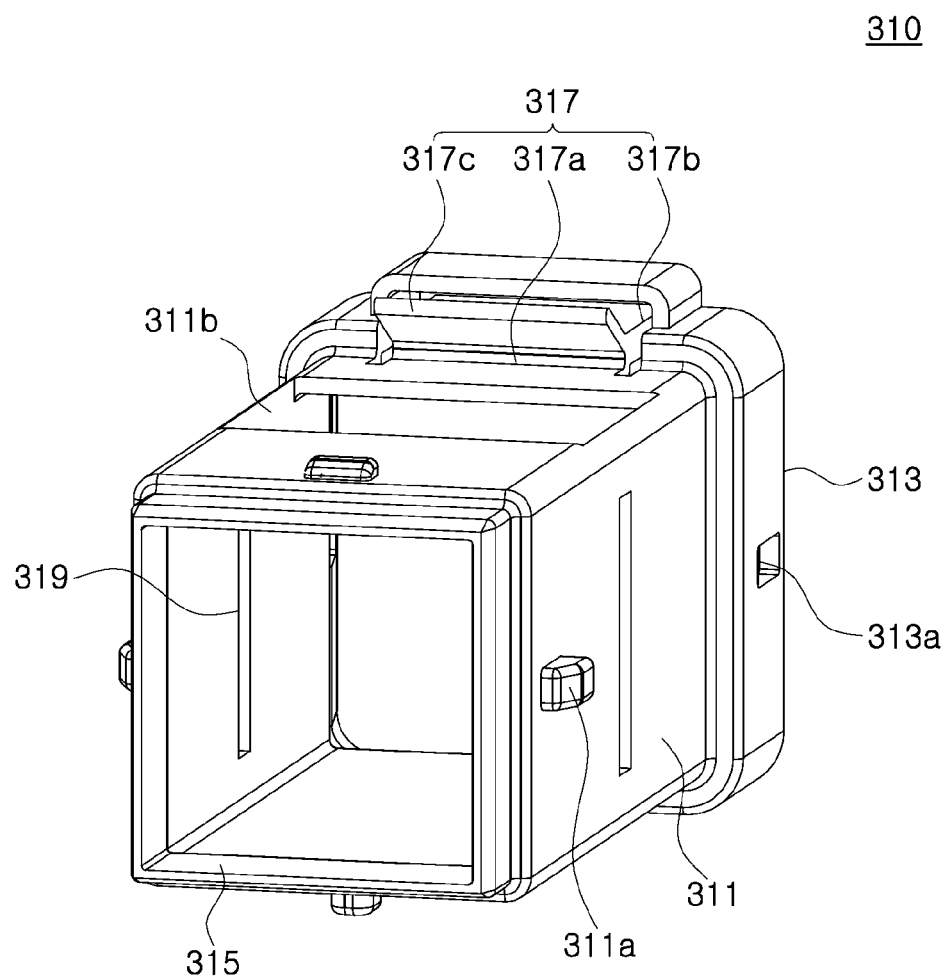
FIG. 7 is a perspective view schematically illustrating the other side of the cage in accordance with the embodiment of the present disclosure.
Figure 8:
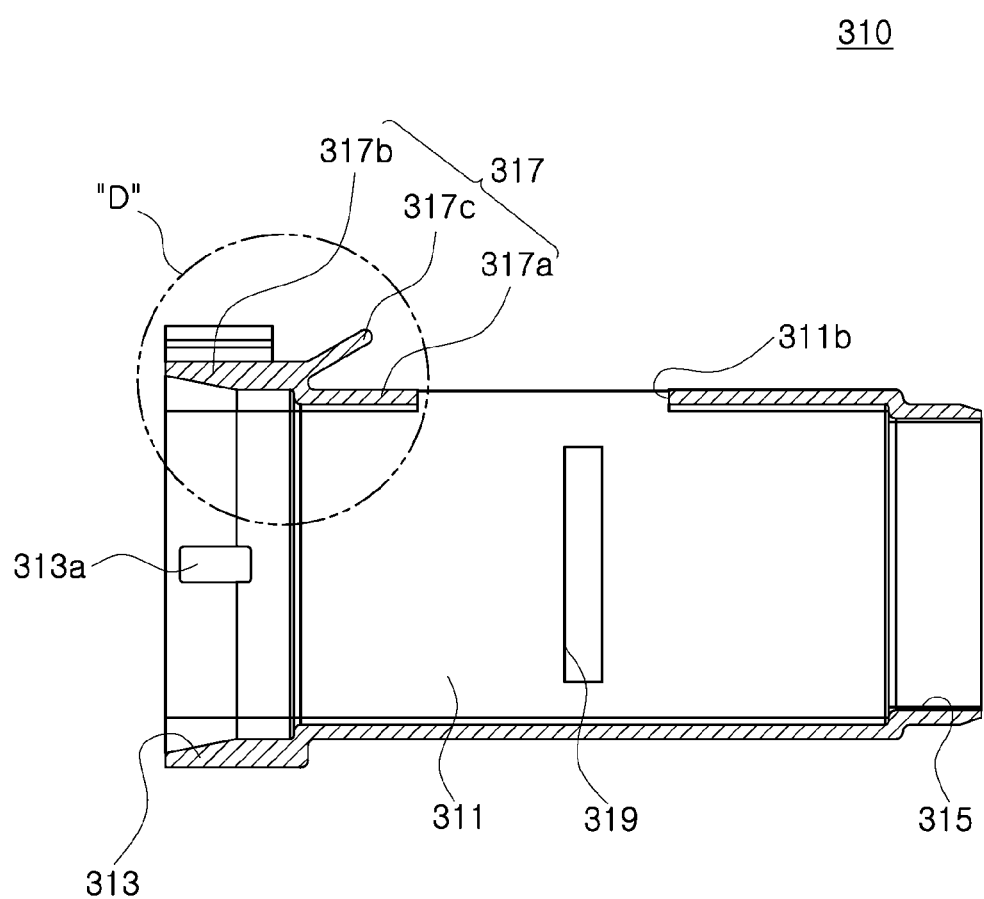
FIG. 8 is a cross-sectional view schematically illustrating the cage in accordance with the embodiment of the present disclosure.
Figure 9:
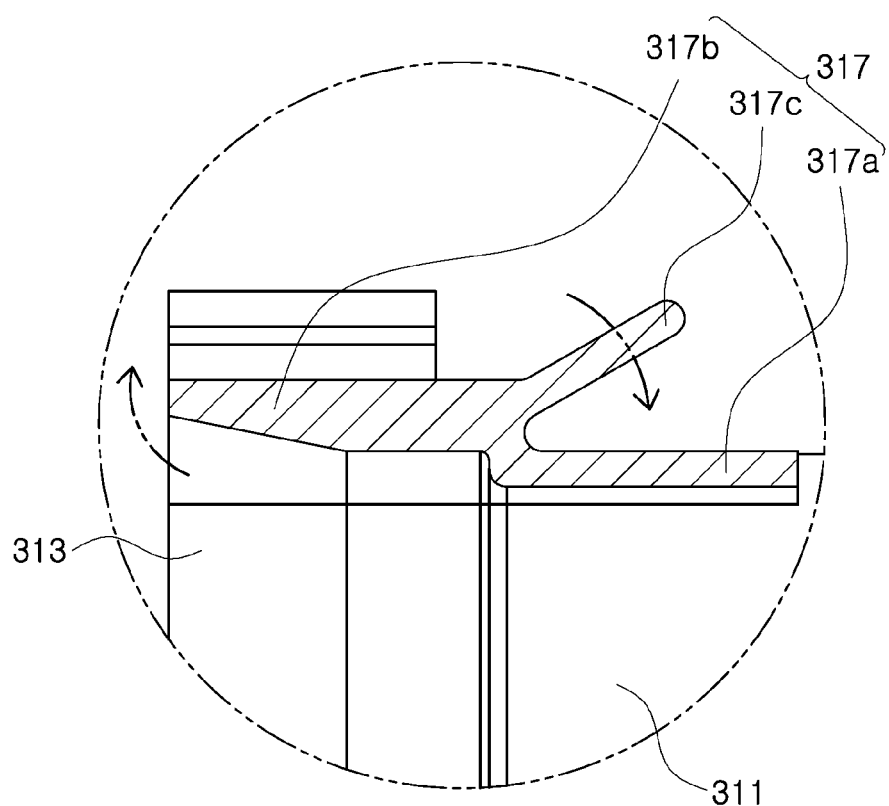
FIG. 9 is a partially expanded cross-sectional view schematically illustrating a portion "D" of FIG. 8.
Figure 10:
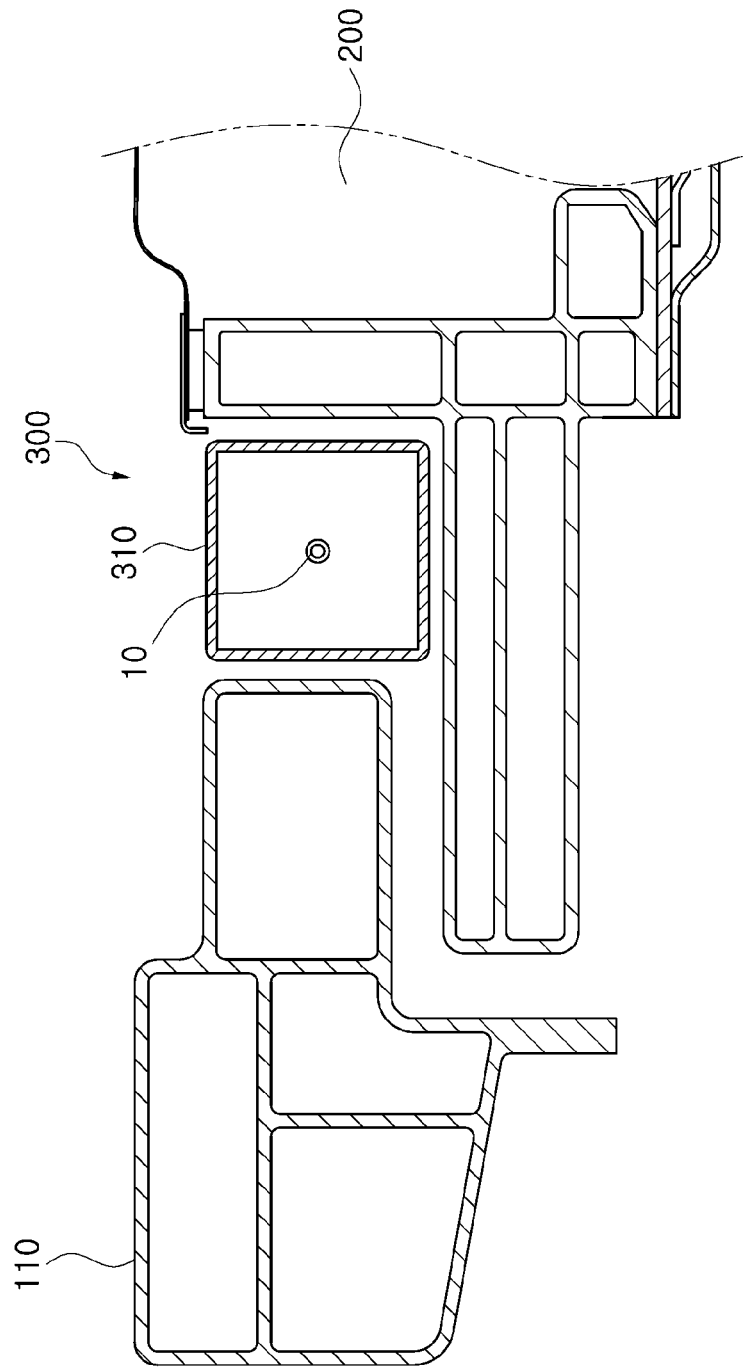
FIG. 10 is a cross-sectional view taken along line a-a of FIG. 4.
Figure 11:
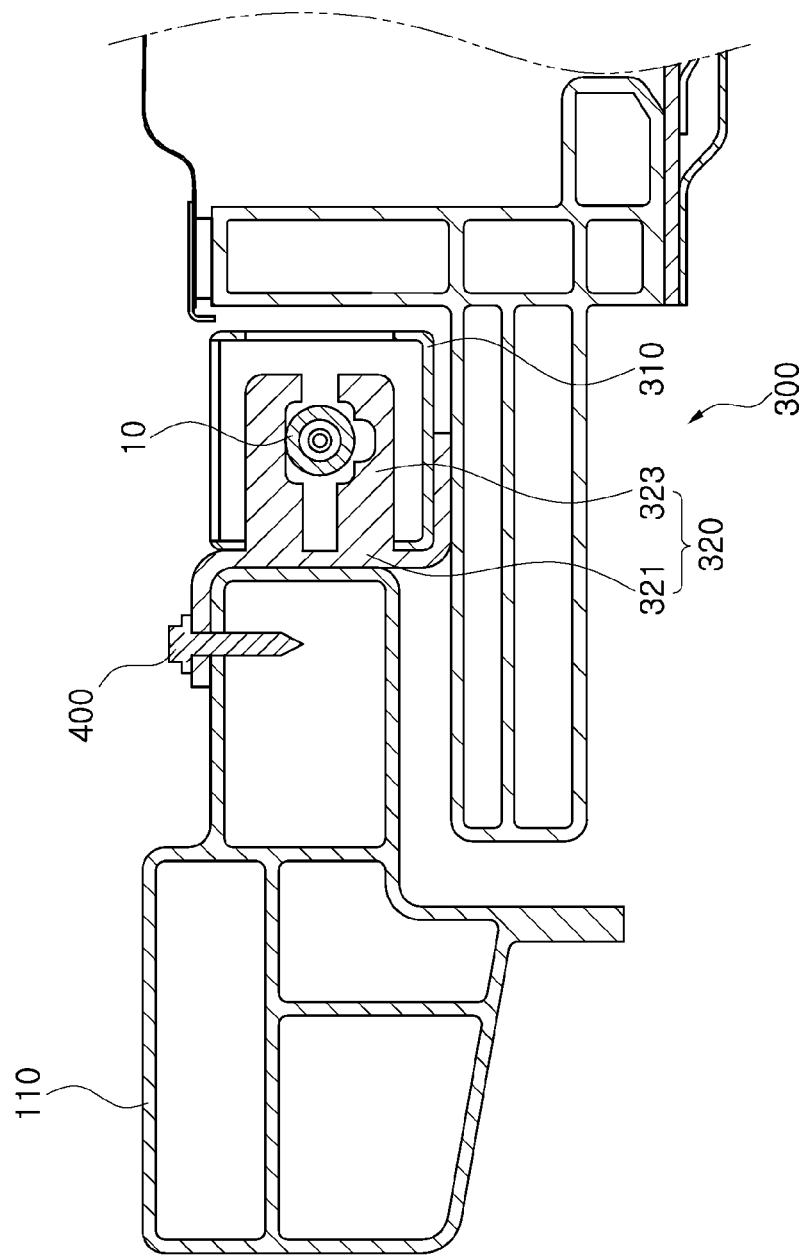
FIG. 11 is a cross-sectional view taken along line b-b of FIG. 4.

FIG. 1 is a perspective view schematically illustrating a chassis frame module for an electrical vehicle in accordance with an embodiment of the present disclosure, FIG. 2 is a partially expanded perspective view schematically illustrating a portion "A" of FIG. 1, FIG. 3 is an assembled perspective view schematically illustrating the chassis frame module for an electrical vehicle in accordance with the embodiment of the present disclosure, FIG. 4 is a partially expanded perspective view schematically illustrating a portion "B" of FIG. 3, FIG. 5 is a partially expanded perspective view schematically illustrating a portion "C" of FIG. 3, FIG. 6 is a perspective view schematically illustrating one side of a cage in accordance with the embodiment of the present disclosure, FIG. 7 is a perspective view schematically illustrating the other side of the cage in accordance with the embodiment of the present disclosure, FIG. 8 is a cross-sectional view schematically illustrating the cage in accordance with the embodiment of the present disclosure, FIG. 9 is a partially expanded cross-sectional view schematically illustrating a portion "D" of FIG. 8, FIG. 10 is a cross-sectional view taken along line a-a of FIG. 4, and FIG. 11 is a cross-sectional view taken along line b-b of FIG. 4.

Referring to FIGS. 1 to 11, the chassis frame module for an electric vehicle in accordance with the embodiment of the present disclosure includes a chassis frame 100, a battery 200 and a wire assembly 300.

The chassis frame 100 serves to support the bottom of a vehicle body (not illustrated), and protect the vehicle body from a vehicle accident or the like. The chassis frame 100 includes a side frame 110, an inclined frame 120, a front frame 130 and a rear frame 140.

In the present disclosure, the chassis frame 100 may be made of a metal or elastic fiber. The chassis frame 100 may be made of a metal including a light metal or a metal including elastic fiber, and thus improve the strength and hardness of the vehicle and improve the fuel efficiency of the vehicle, while reducing the weight of the vehicle. Examples of the light metal included in the chassis frame 100 may include aluminum, magnesium and the like.

The vehicle body is a structure of the vehicle, which is designed to contain and protect mechanical parts, passengers and freight, and has a shape that is decided according to the use and size of the vehicle or the like. The vehicle body is seated on the top of the chassis frame to support the vehicle body.

The side frame 110 is provided as a pair of side frames which are spaced apart from each other in the widthwise direction (side-to-side direction in FIG. 1) of the vehicle body such that the battery 200 is disposed therebetween, and the vehicle body is seated on the pair of side frames. An extruded material (e.g. aluminum or the like) manufactured through an extrusion method may be used for the side frame 110.

The inclined frame 120 is provided as a pair of inclined frames connected to the respective front ends (right ends in FIG. 1) of the pair of side frames 110. The pair of inclined frames are installed so as to be inclined in directions facing each other, such that the distance therebetween gradually decreases toward the front (to the right in FIG. 1). An extruded material (e.g. aluminum or the like) manufactured through an extrusion method may be used for the inclined frame 120.

The front frame 130 is connected to the inclined frames 120, and disposed at the front (right in FIG. 1) of the vehicle. An extruded material (e.g. aluminum or the like) manufactured through an extrusion method may be used for the front frame 130.

The rear frame 140 serves to connect the rear ends of the side frames 110, and is disposed at the front (left in FIG. 1) of the vehicle body. An extruded material (e.g. aluminum or the like) manufactured through an extrusion method may be used for the rear frame 140.

The battery 200 is installed on the chassis frame 100, and serves to store electric power and supply the electric power to the vehicle. The battery 200 is disposed between the pair of side frames 110 in the chassis frame 100.

The wire assembly 300 is disposed between the side frame 110 and the battery 200, is provided as a plurality of wire assemblies disposed in the longitudinal direction of the side frame 110, and serves to contain a wire in an internal space thereof.

The plurality of wire assemblies 300 are each modularized to have a preset length, and disposed in the longitudinal direction of the side frame 110 so as to correspond to the length L of the side frame 110. As the plurality of wire assemblies 300 are modularized and disposed according to the length L of the side frame 110, the wire assemblies 300 may be applied to various side frames 110 which are modified according to the specification and concept of the vehicle.

Furthermore, the wire assembly 300 may contain a wire 10 therein such that the wire 10 is not exposed to the outside, which makes it possible to prevent corrosion of the wire 10. The wire assembly 300 is connected to the side frame 110 by a fastener 400.

The wire assembly 300 includes a cage 310 and a clip 320. The cage 310 is disposed between the side frame 110 and the battery 200, and provided as a plurality of cages which are disposed in the longitudinal direction of the side frame 110 so as to correspond to the length L of the side frame 110. The number of the cages 310 may be set to a value corresponding to the length of the side frame 110, such that the cages 310 can be applied to various side frames 110 which are modified according to the specification of the vehicle.

The cage 310 includes a cage body 311, a cage holding part 313, a cage insertion part 315 and a lever 317. The cage body 311 is formed in a hollow shape, and houses the wire 10 in the internal space thereof. The cage body 311 is provided as a plurality of cage bodies disposed in the longitudinal direction of the side frame 110, and the neighboring cage bodies 311 are coupled to each other as one body.

The cage holding part 313 is formed on one side (left side in FIG. 5) of the cage body 311, and serves to hold the neighboring cage body 311. That is, the cage holding part 313 of the cage 310 holds the cage insertion part 315 of the neighboring cage 310 disposed on the left side in FIG. 5.

The cage insertion part 315 is formed on the other side (right side in FIG. 5) of the cage body 311, and inserted into the neighboring cage body 311. That is, the cage insertion part 315 of the cage 310 is inserted into the cage holding part 313 of the neighboring cage 310 disposed on the right side in FIG. 5.

The lever 317 is inserted into one side (left side in FIG. 8) of the cage holding part 313, and serves to expand an opening of the cage holding part 313. When the opening of the cage holding part 313 is expanded by the operation of the lever 317, the cage insertion part 315 inserted into the cage holding part 313 may be separated from the cage holding part 313.

In the present disclosure, the inner surface of the cage holding part 313 has a width that decreases toward the inside of the cage body 311, and the outer surface of the cage insertion part 315 has a width that decreases toward the outside of the cage body 311.

Therefore, as the inner surface of the cage holding part 313 has a width that decreases toward the inside of the cage body 311, and the outer surface of the cage insertion part 315 has a width that decreases toward the outside of the cage body 311, the cage insertion part 315 may be easily inserted or introduced into the cage holding part 313.

In the present disclosure, the cage holding part 313 has an insertion hole 313a, and the cage body 311 has a protrusion 311a formed on the outer surface thereof. The protrusion 311a is inserted into the insertion hole 313a of the neighboring cage holding part 313. The cage body 311 has an open surface 311b formed on one side (top side in FIG. 5) thereof. Through the open surface 311b, a clip fitting part 330 is inserted into the cage body 311.

That is, when any one cage 310 is coupled to the neighboring cage 310 in FIG. 5, the protrusion 311a of the any one cage 310 is inserted into the insertion hole 313a of the cage 310 located on the right side of the any one cage 310, and the protrusion 311a of the cage 310 located on the left side of the any one cage 310 is inserted into the insertion hole 313a of the any one cage 310.

When the opening of the cage holding part 313 is expanded by the operation of the lever 317 while the protrusion 311a and the insertion hole 313a are connected to each other, the protrusion 311a and the insertion hole 313a are separated from each other, and the connected cages 310 are separated from each other.

The lever 317 includes a first lever support part 317a, a second lever support part 317b and a lever manipulation part 317c. The first lever support part 317a is supported by one surface (left top surface in FIG. 8) of the cage body 311. The second lever support part 317b is extended from the first lever support part 317a to the left (based on FIG. 8), and inserted into one side (left side in FIG. 8) of the cage holding part 313.

The lever manipulation part 317c is extended from the second lever support part 317b, and pressed to turn the second lever support part 317b, thereby expanding the opening of the cage holding part 313. Referring to FIG. 9, when the lever manipulation part 317c is pressed and turned in the clockwise direction, the second lever support part 317b connected to the lever manipulation part 317c is also turned in the clockwise direction to expand the opening of the cage holding part 313. At this time, the protrusion 311a is separated from the insertion hole 313a, and the connected cages 310 are separated from each other.

In the present disclosure, the wire cage 310 is made of a plastic material having preset strength and hardness. The preset strength and hardness of the wire cage 310 indicate strength and hardness which are set to such an extent that the wire cage 310 can connect the battery 200 and the side frame 110 while supporting the weight of the battery 200, and can be broken when external shock equal to or more than a preset level of shock is transferred from the side frame 110, thereby buffering the shock transferred to the battery 200.

Therefore, in case of a side collision of the vehicle, the wire cage 310 may be broken by shock transferred from the side frame 110, and disperse a collision load. As a result, the wire cage 310 may reduce the damage to the battery 200, thereby reducing an occurrence of accident such as a fire.

The clip 320 has one side (left side in FIG. 5) supported by the cage 310 and the other side (right side in FIG. 5) connected to the side frame 110. The clip 320 includes a clip body 321 and a clip through part 323.

The clip body 321 has one side (bottom side in FIG. 5) supported by the cage body 311 and the other side (top side in FIG. 5) connected to the side frame 110. The clip body 321 is formed in a shape similar to the S-shape. The other side of the clip body 321 is fixedly connected to the side frame 110 by the fastener 400.

The clip through part 323 is mounted on one surface (right surface in FIG. 5) of the clip body 321 and inserted into the cage body 311, and serves to support the wire 10. The clip through part 323 has a hole formed in the center thereof, such that the wire 10 is inserted into the hole formed in the center of the clip through part 323 to support the wire 10.

The cage 310 further includes a slit 319 formed through a side surface of the cage body 311. The clip through part 323 is inserted into the clip body 321 through the slit 319 of the cage 310.

The wire assembly 300 further includes the clip fitting part 330. One side (bottom side in FIG. 5) of the clip fitting part 330 is open to surround the outer surface of the wire 10, and the other side of the clip fitting part 330 is placed on the outer surface of the clip through part 323. The other side of the clip fitting part 330 is formed in a ring shape, and hooked and placed on the outer surface of the clip through part 323. The clip fitting part 330 surrounds the outer surface of the wire 10 and thus prevents the separation of the wire 10.

The wire 10 is provided as a plurality of wires which correspond to the modularized wire assemblies 300 and are used as connectable power connections or pipes. In the present disclosure, the wire 10 includes a wire body 11, a first wire end part 13 and a second wire end part 15.

The wire body 11 is formed in a rod shape with a preset length. The first wire end part 13 is mounted on one side (left side in FIG. 5) of the wire body 11, and has an outer surface on which the clip fitting part 330 is mounted. The second wire end part 15 is mounted on the other side (right side in FIG. 5) of the wire body 11, and inserted into the first wire end part 13 of the neighboring wire body 11 disposed on the right side in FIG. 5. By sequentially connecting the first wire end parts 13 and the second wire end parts 15 of the neighboring wires 10, the length of the wire 10 can be adjusted so as to correspond to the modularized wire assembly 300.

In the chassis frame module for an electric vehicle in accordance with the embodiment of the present disclosure, the wire 10 may be housed in the wire assembly 300 which connects the side frame 110 and the battery 200. Thus, the space efficiency of the chassis frame module may be increased so that the chassis frame module can be manufactured in a shape proper to the concept of the vehicle.

Furthermore, as the plurality of wire assemblies 300 are modularized and disposed according to the length of the side frame 110, the wire assemblies 300 may be applied to the side frame 110 which is modified according to the specification and concept of the vehicle.

Furthermore, the wire 10 may be housed in the wire assembly 300, which makes it possible to reduce the corrosion of the wire, caused by the exposure to the outside.

Furthermore, the wire assembly 300 may be interposed between the side frame 110 and the battery 200. Thus, in case of a side collision of the vehicle, the wire assembly 300 can disperse a collision load and reduce the damage to the battery 200, thereby reducing an occurrence of accident such as a fire.

Figure 12:
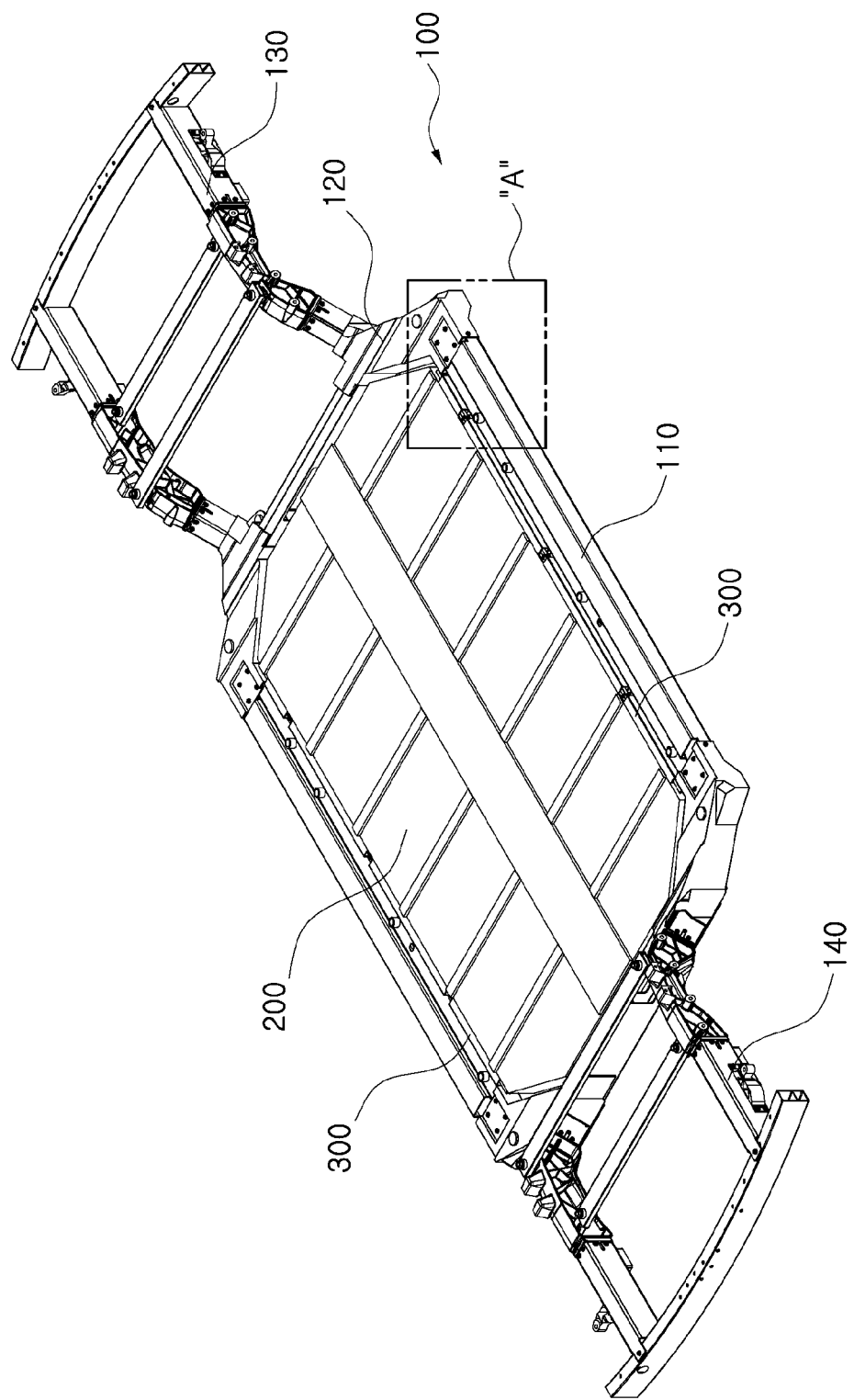
FIG. 12 is a perspective view schematically illustrating a chassis frame module for an electric vehicle in accordance with another embodiment of the present disclosure.
Figure 13:
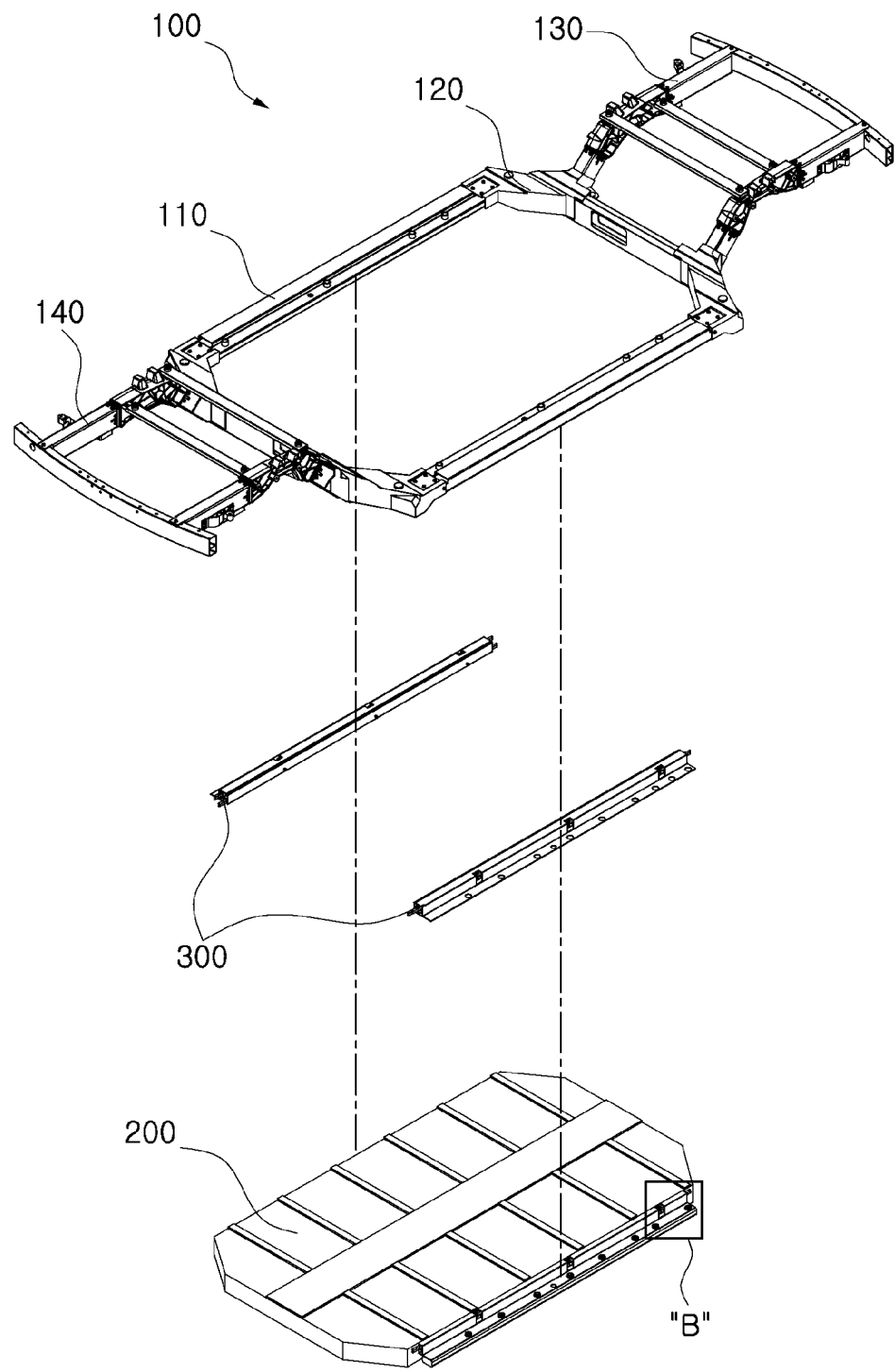
FIG. 13 is an assembled perspective view schematically illustrating the chassis frame module for an electric vehicle in accordance with the another embodiment of the present disclosure.
Figure 14:
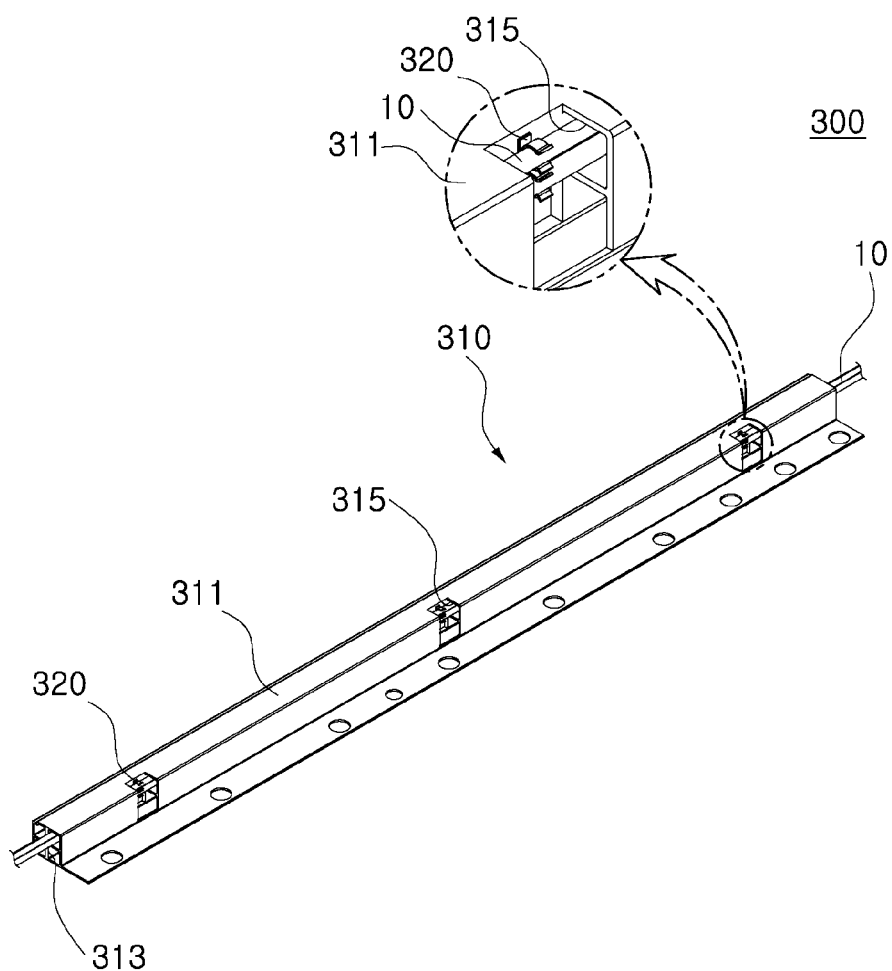
FIG. 14 is a perspective view schematically illustrating a wire assembly in accordance with the another embodiment of the present disclosure.
Figure 15:
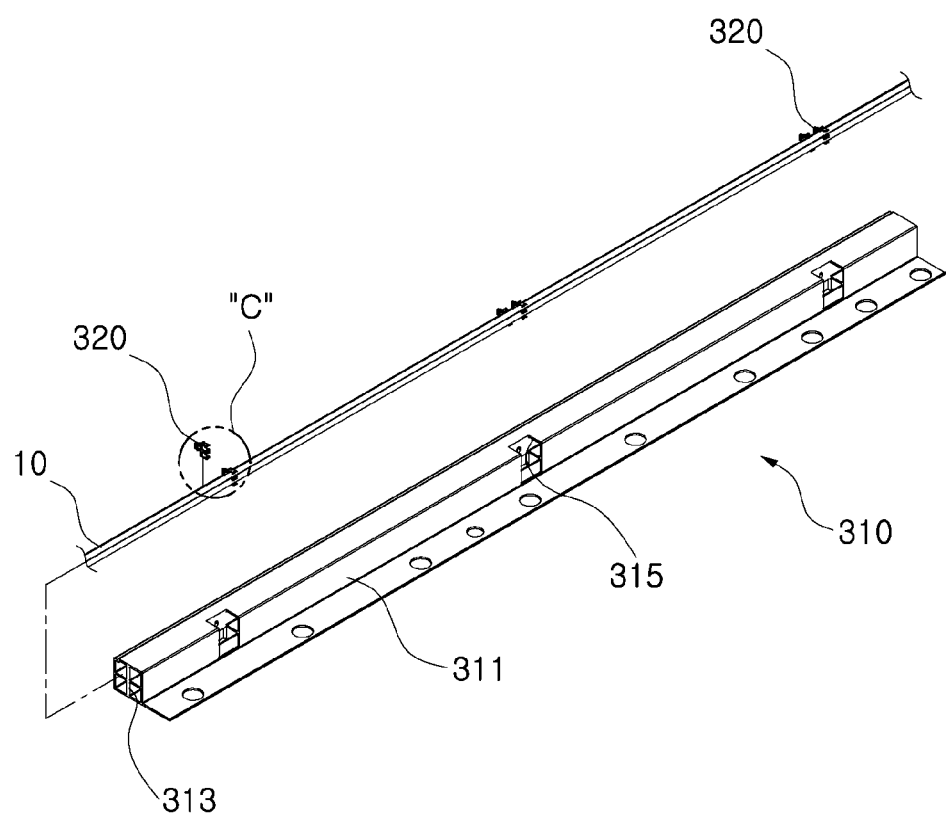
FIG. 15 is an assembled perspective view schematically illustrating the wire assembly in accordance with the another embodiment of the present disclosure.
Figure 16:
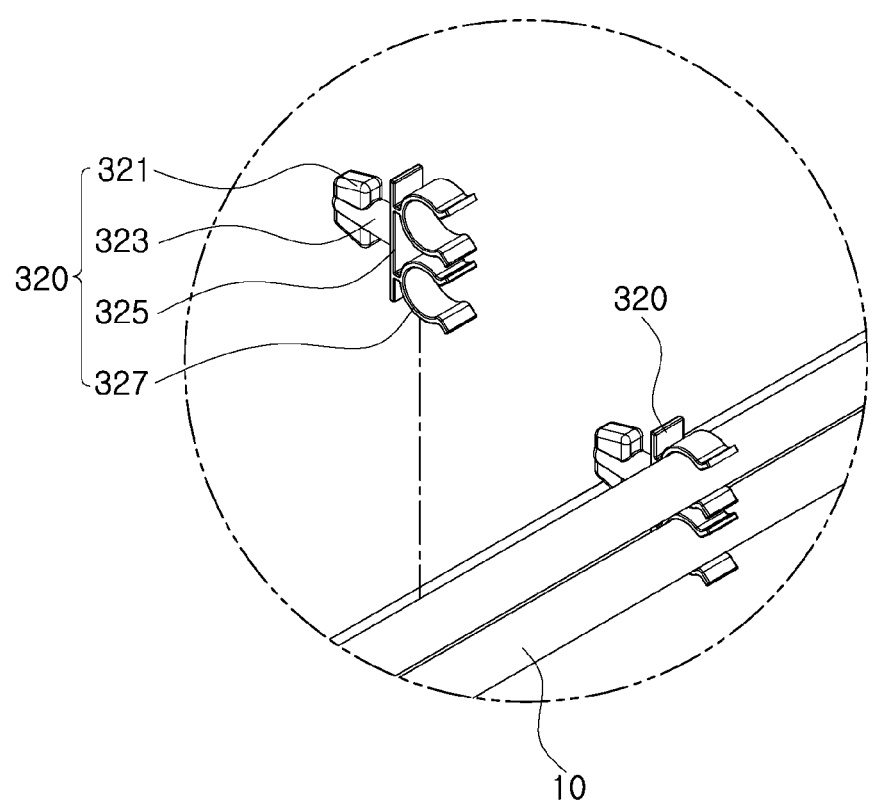
FIG. 16 is a partially expanded perspective view schematically illustrating a portion "C" of FIG. 15.
Figure 17:
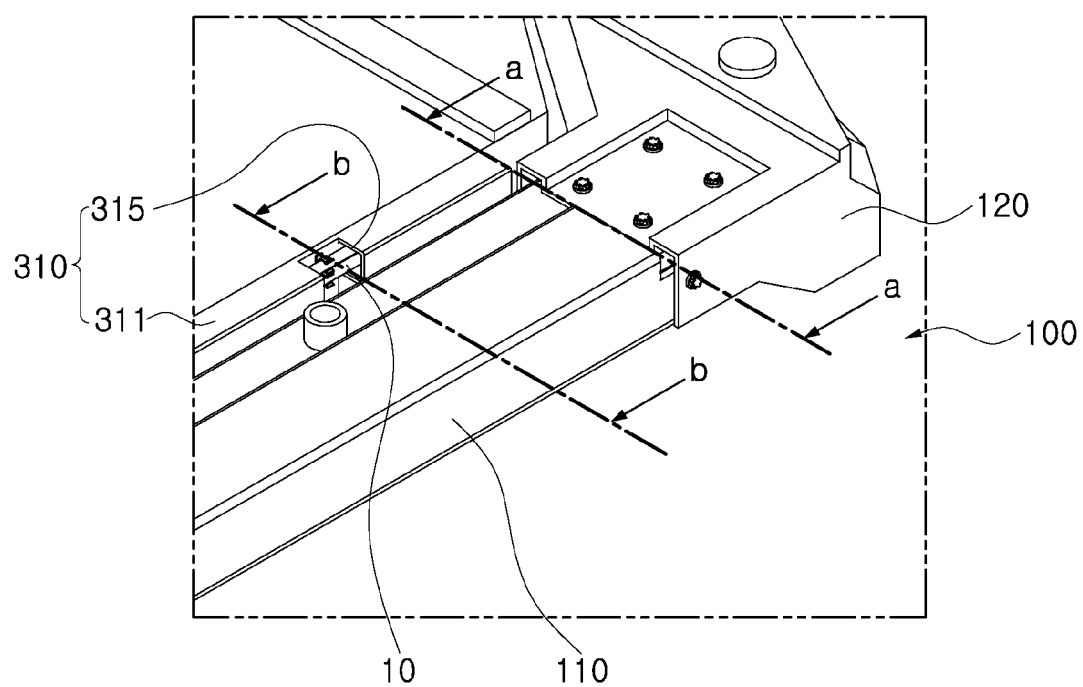
FIG. 17 is a partially expanded perspective view schematically illustrating a portion "A" of FIG. 12.
Figure 18:
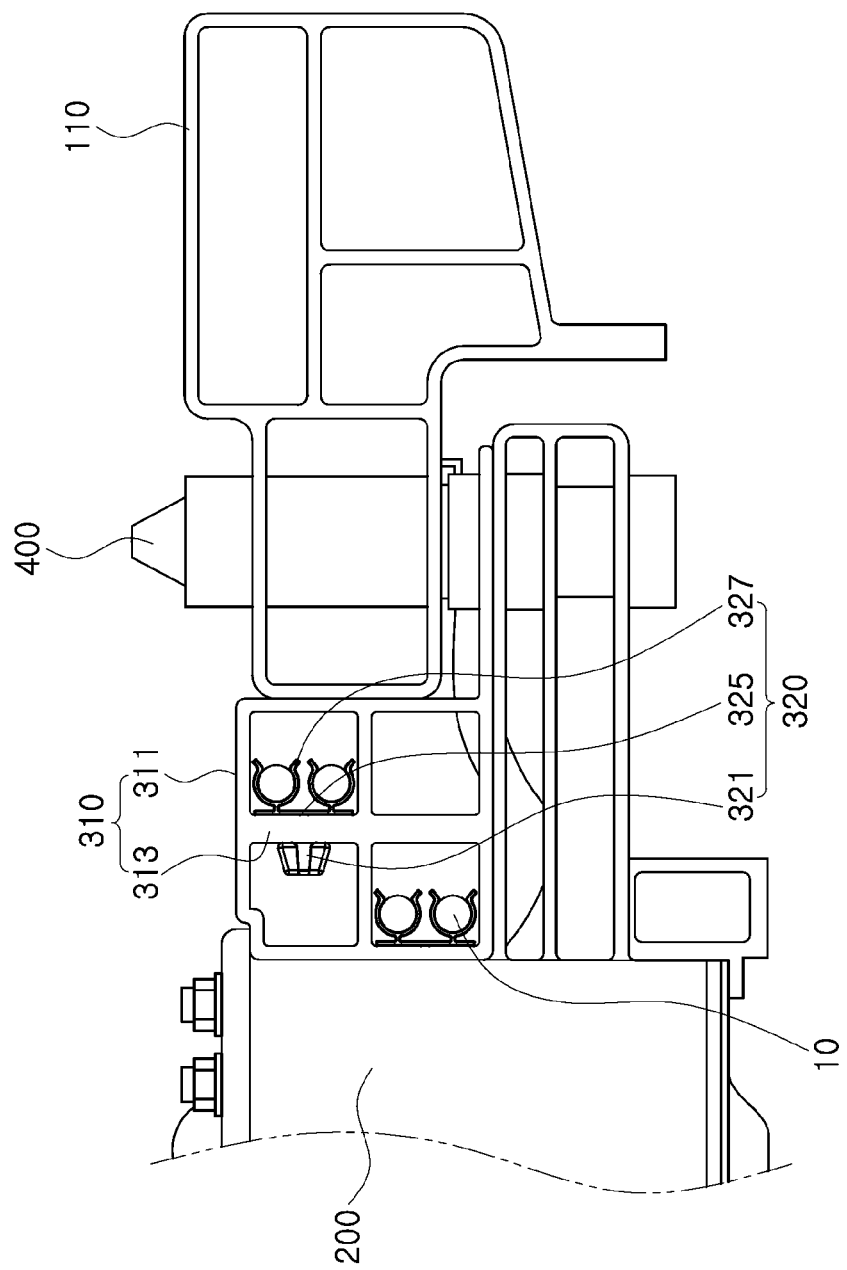
FIG. 18 is a schematic cross-sectional view taken along line a-a of FIG. 17.
Figure 19:
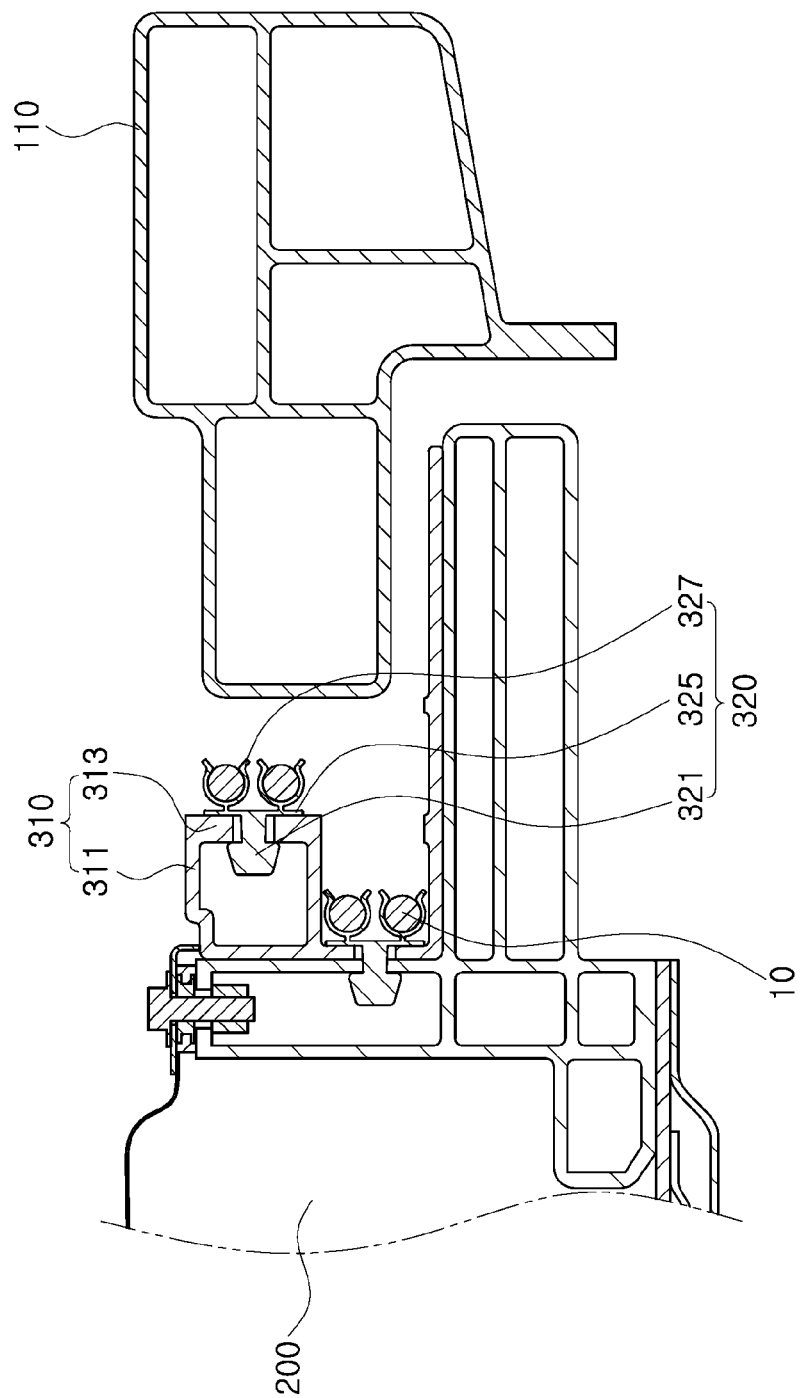
FIG. 19 is a schematic cross-sectional view taken along line b-b of FIG. 17.
Figure 20:
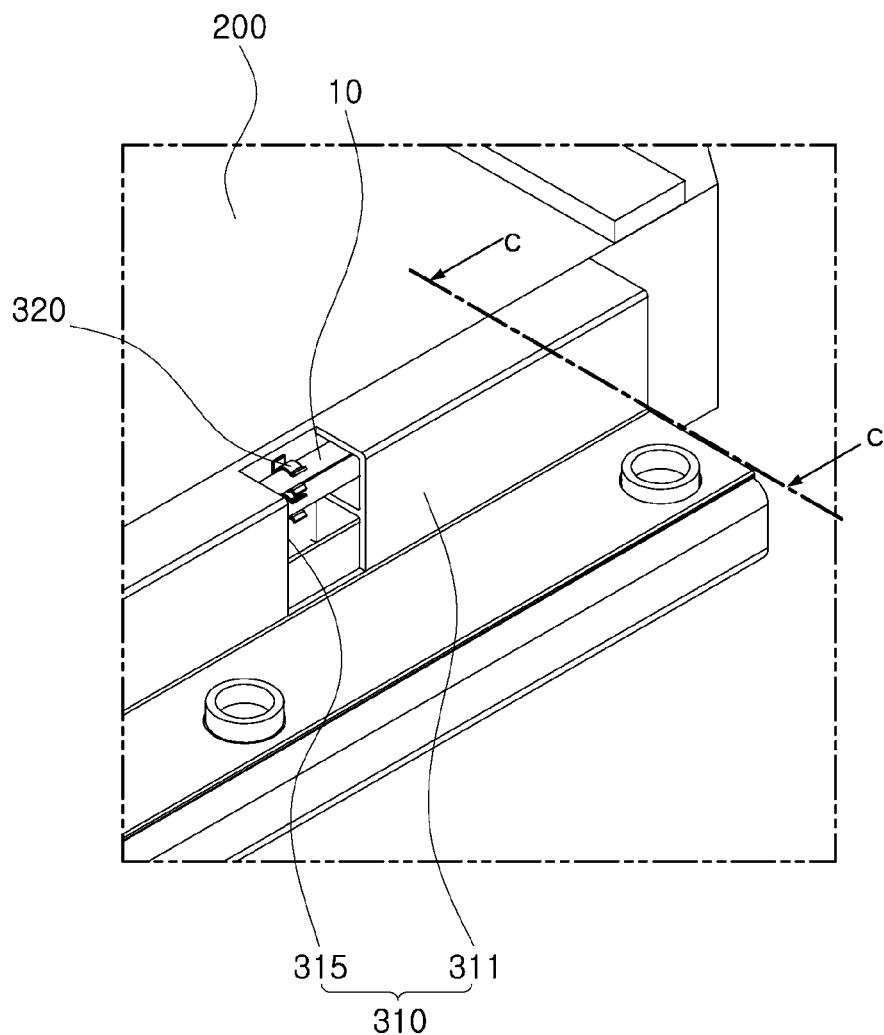
FIG. 20 is a partially expanded perspective view schematically illustrating a portion "B" of FIG. 13.
Figure 21:
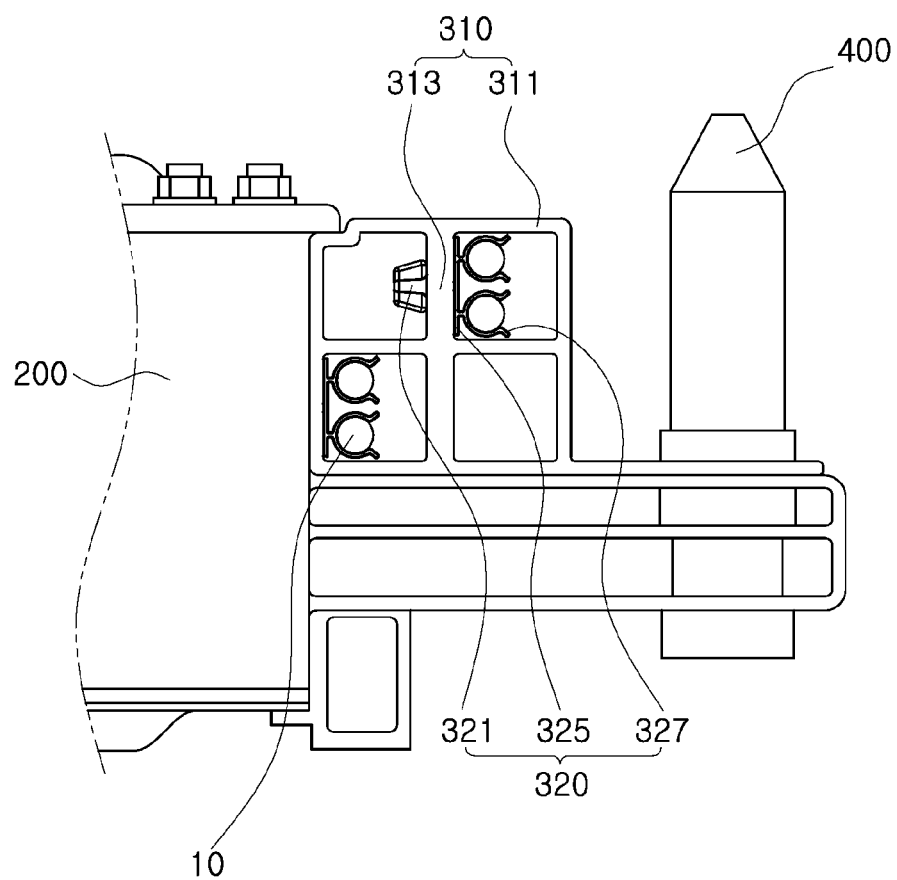
FIG. 21 is a schematic cross-sectional view taken along line c-c of FIG. 20.

FIG. 12 is a perspective view schematically illustrating a chassis frame module for an electric vehicle in accordance with another embodiment of the present disclosure, FIG. 13 is an assembled perspective view schematically illustrating the chassis frame module for an electric vehicle in accordance with the another embodiment of the present disclosure, FIG. 14 is a perspective view schematically illustrating a wire assembly in accordance with the another embodiment of the present disclosure, FIG. 15 is an assembled perspective view schematically illustrating the wire assembly in accordance with the another embodiment of the present disclosure, FIG. 16 is a partially expanded perspective view schematically illustrating a portion "C" of FIG. 15, FIG. 17 is a partially expanded perspective view schematically illustrating a portion "A" of FIG. 12, FIG. 18 is a schematic cross-sectional view taken along line a-a of FIG. 17, FIG. 19 is a schematic cross-sectional view taken along line b-b of FIG. 17, FIG. 20 is a partially expanded perspective view schematically illustrating a portion "B" of FIG. 13, and FIG. 21 is a schematic cross-sectional view taken along line c-c of FIG. 20.

Referring to FIGS. 12 to 21, a chassis frame module for an electric vehicle in accordance with another embodiment of the present disclosure includes a chassis frame 100, a battery 200, and a wire assembly 300.

The chassis frame 100 serves to support the bottom of a vehicle body (not illustrated), and protect the vehicle body from a vehicle accident or the like. The chassis frame 100 includes a side frame 110, an inclined frame 120, a front frame 130 and a rear frame 140.

In the present disclosure, the chassis frame 100 may be made of a metal or elastic fiber. The chassis frame 100 may be made of a light metal or a metal including elastic fiber, and thus improve the strength and hardness of the vehicle and improve the fuel efficiency of the vehicle, while reducing the weight of the vehicle. Examples of the light metal included in the chassis frame 100 may include aluminum, magnesium and the like.

The vehicle body is a structure of the vehicle, which is designed to contain and protect mechanical parts, passengers and freight, and has a shape decided according to the use and size of the vehicle or the like. The vehicle body is seated on the top of the chassis frame to support the vehicle body.

The side frame 110 is provided as a pair of side frames which are spaced apart from each other in the widthwise direction (side-to-side direction in FIG. 12) of the vehicle body such that the battery 200 is disposed therebetween, and the vehicle body is seated on the pair of side frames. An extruded material (e.g. aluminum or the like) manufactured through an extrusion method may be used for the side frame 110.

The inclined frame 120 is provided as a pair of inclined frames connected to the respective front ends (right ends in FIG. 12) of the pair of side frames 110. The pair of inclined frames are installed so as to be inclined in directions facing each other, such that the distance therebetween gradually decreases toward the front (to the right in FIG. 12). An extruded material (e.g. aluminum or the like) manufactured through an extrusion method may be used for the inclined frame 120.

The front frame 130 is connected to the inclined frames 120, and disposed at the front (right in FIG. 12) of the vehicle body. An extruded material (e.g. aluminum or the like) manufactured through an extrusion method may be used for the front frame 130.

The rear frame 140 serves to connect the rear ends of the side frames 110, and is disposed at the rear (left in FIG. 12) of the vehicle body. An extruded material (e.g. aluminum or the like) manufactured through an extrusion method may be used for the rear frame 140.

The battery 200 is installed on the chassis frame 100, and serves to store electric power and supply the electric power to the vehicle. The battery 200 is disposed between the pair of side frames 110 in the chassis frame 100.

The wire assembly 300 is connected to the side frame 110 and the battery 200, and contains a wire 10 in an internal space thereof. The wire 10 may be contained in the wire assembly 300 so as not to be exposed to the outside, which makes it possible to prevent corrosion of the wire 10.

The wire assembly 300 is connected to the side frame 110 by a fastener 400. The wire assembly 300 includes a wire cage 310 and a clip 320. The wire cage 310 has one side (right side in FIG. 14) connected to the side frame 110 and the other side (left side in FIG. 14) connected to the battery 200. The wire cage 310 has an internal space in which the wire 10 is contained.

The wire assembly 300 is disposed between the side frame 110 and the battery 200. The clip 320 of the wire assembly 300 is coupled to the side frame 110, and the wire cage 310 of the wire assembly 300 is assembled and fixed to the outer wall of the battery 200 with the clip 320.

The wire cage 310 includes a cage body 311 and a grid part 313. The cage body 311 has one side (right side in FIG. 14) connected to the side frame 110 and the other side (left side in FIG. 14) connected to the battery 200, and has an internal space formed therein. The wire 10 is inserted and contained in the internal space of the hollow wire cage 310.

The grid part 313 is mounted in the internal space of the cage body 311, and formed in a grid shape to divide the space in which a plurality of clips 320 are mounted. That is, the grid part 313 has a cross-shaped cross-section. The cross-shaped grid part 313 may form four divided spaces, and the plurality of clips 320 may be mounted in the respective divided spaces. As the divided spaces are formed in the cage body 311 by the grid part 313, the plurality of wires 10 mounted on the clips 320 are separately disposed so as not to overlap each other.

In the present disclosure, the wire cage 310 is made of a plastic material having preset strength and hardness. The preset strength and hardness of the wire cage 310 indicate strength and hardness which are set to such an extent that the wire cage 310 can connect the battery 200 and the side frame 110 while supporting the weight of the battery 200, and can be broken when external shock equal to or more than a preset level of shock is applied from the side frame 110, thereby buffering the shock applied to the battery 200.

Therefore, in case of a side collision of the vehicle, the wire cage 310 may be broken by shock applied from the side frame 110, and disperse a collision load. As a result, the wire cage 310 may reduce the damage to the battery 200, thereby reducing an occurrence of accident such as a fire.

In the present disclosure, the wire cage 310 further includes an observation window 315. The observation window 315 is provided as a plurality of observation windows 315 formed in the cage body 311 along the length of the cage body 311. The observation window 315 is open toward the side frame 110 from the cage body 311. Through the open observation window 315, an operator may confirm whether the wire 10 is inserted and contained into the cage body 311, and check whether the wire 10 is normally mounted on the clip 320 mounted in the cage body 311.

The clip 320 is mounted in the wire cage 310, such that the wire 10 is seated on the clip 320. The clip 320 having the wire 10 seated thereon prevents the separation of the wire 10. The clip 320 is detachably mounted in the wire cage 310. As the clip 320 is detachably mounted in the wire cage 310, the clip 320 may be easily assembled to/separated from the wire cage 310, such that an operator can perform repair or replacement.

The clip 320 includes a clip insertion part 321, a clip rod part 323, a contact surface part 325, and an elastic coupling part 327. The clip insertion part 321 is mounted on the cage body 311 of the wire cage 310. The clip insertion part 321 is detachably mounted on the cage body 311 of the wire cage 310.

The clip insertion part 321 is formed in an arrowhead shape whose size gradually decreases in the insertion direction to the wire cage 310, and made of an elastically deformable material. The clip insertion part 321 is formed in an arrowhead shape whose size gradually decreases in the insertion direction to the wire cage 310, and thus easily inserted into the cage body 311 of the wire cage 310.

Furthermore, the clip insertion part 321 is made of an elastically deformable material. Therefore, the clip insertion part 321 is compressed when inserted into the cage body 311 of the wire cage 310, and then elastically restored after the insertion into the cage body 311 of the wire cage 310. Thus, the clip insertion part 321 may be prevented from being separated from the cage body 311.

The clip rod part 323 is extended from one side (right side in FIG. 16) of the clip insertion part 321, and formed in a rod shape with a preset length. The clip rod part 323 connects the clip insertion part 321 and the contact surface part 325, and is inserted into a through-hole of the cage body 311.

The contact surface part 325 is mounted at an end (right end in FIG. 16) of the clip rod part 323, and comes into contact with one surface of the cage body 311 of the wire cage 310. The contact surface part 325 comes in contact with the one surface of the cage body 311 of the wire cage 310, and thus serves as a stopper to restrict the movement of the clip insertion part 321 and the clip rod part 323.

The elastic coupling part 327 is formed on one side of the contact surface part 325, has a ring shape whose one side (right side in FIG. 16) is open, and is elastically coupled to the wire 10. The elastic coupling part 327 is made of a metal or plastic material. When the wire 10 is inserted into the opening of the elastic coupling part 327, the elastic coupling part 327 may be spread. Then, the elastic coupling part 327 may be retracted while surrounding the outer surface of the wire 10, and elastically coupled to the wire 10, thereby preventing the separation of the wire 10.

In the chassis frame module for an electric vehicle in accordance with the present disclosure, the wire 10 may be contained in the wire assembly 300 which connects the side frame 110 and the battery 200. Thus, the space efficiency of the chassis frame module may be improved so that the chassis frame module can be manufactured in a shape proper to the concept of the vehicle.

Furthermore, the wire 10 may be contained in the wire assembly 300, which makes it possible to reduce the corrosion of the wire 10, caused by the exposure to the outside.

Furthermore, the wire assembly 300 may be interposed between the side frame 110 and the battery 200. Thus, in case of a side collision of the vehicle, the wire assembly 300 can disperse a collision load and reduce the damage to the battery 200, thereby reducing the occurrence of accident such as a fire.

In the chassis frame module for an electric vehicle described above, the wire may be housed in the wire assembly which connects the side frame and the battery. Thus, the space efficiency of the chassis frame module may be increased so that the chassis frame module can be manufactured in a shape proper to the concept of the vehicle.

Furthermore, as the plurality of wire assemblies are modularized and disposed according to the length of the side frame, the wire assemblies may be applied to the side frame which is modified according to the specification and concept of the vehicle.

Furthermore, the wire may be housed in the wire assembly, which makes it possible to reduce the corrosion of the wire, caused by the exposure to the outside.

Furthermore, the wire assembly may be interposed between the side frame and the battery. Thus, in case of a side collision of the vehicle, the wire assembly can disperse a collision load and reduce the damage to the battery, thereby reducing an occurrence of accident such as a fire.

Furthermore, the chassis frame module for an electrical vehicle can improve the coupling performance of a wire to a chassis frame module.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A chassis frame module for an electric vehicle, comprising:
   a chassis frame comprising
   a pair of side frames;
   a pair of inclined frames connected to front ends of the respective side frames, respectively, and a distance between the pair of inclined frames decreases toward the front;
   a front frame connected to the inclined frames; and
   a rear frame connected to rear ends of the pair of side frames;
   a battery disposed between the pair of side frames; and
   a plurality of wire assemblies disposed between the side frame and the battery and in a longitudinal direction of the side frame, and being configured to house a wire in an internal space thereof.

2. The chassis frame module of claim 1, wherein the plurality of wire assemblies each comprise:
   a cage disposed between the side frame and the battery, and in the longitudinal direction of the side frame; and
   a clip having one side supported by the cage and the other side connected to the side frame.

3. The chassis frame module of claim 2, wherein the cage comprises:
a cage body formed in a hollow shape, and being configured to house the wire in an internal space thereof;
a cage holding part formed on one side of the cage body, and configured to hold a neighboring cage body;
a cage insertion part formed on the other side of the cage body, and inserted into the neighboring cage body; and
a lever inserted into one side of the cage holding part, and configured to expand an opening of the cage holding part.

4. The chassis frame module of claim 3, wherein a width of an inner surface of the cage holding part decreases toward an inside of the cage body, and
a width of an outer surface of the cage insertion part decreases toward an outside of the cage body.

5. The chassis frame module of claim 3, wherein the lever comprises:
a first lever support part supported by one surface of the cage body;
a second lever support part extending from the first lever support part and being inserted into one side of the cage holding part; and
a lever manipulation part extending from the second lever support part, and being configured to be pressed to turn the second lever support part to expand an opening of the cage holding part.

6. The chassis frame module of claim 3, wherein the cage holding part has an insertion hole formed therein,
the cage body has a protrusion formed on an outer surface thereof, and
the protrusion is inserted into the insertion hole of a neighboring cage holding part.

7. The chassis frame module of claim 3, wherein the clip comprises:
a clip body having one side supported by the cage body and the other side connected to the side frame; and
a clip through part mounted on one surface of the clip body, inserted into the cage body, and being configured to support the wire.

8. The chassis frame module of claim 7, wherein the plurality of wire assemblies each comprise a clip fitting part having one open side to surround an outer surface of the wire and the other side placed on an outer surface of the clip through part.

9. The chassis frame module of claim 8, wherein the wire comprises:
a wire body inserted into an internal space of the cage body;
a first wire end part mounted on one side of the wire body and having the clip fitting part mounted on an outer surface thereof; and
a second wire end part mounted on the other side of the wire body and inserted into a neighboring first wire end part.

10. The chassis frame module of claim 2, wherein the cage is made of a plastic material.

11. A chassis frame module for an electric vehicle, comprising:
a chassis frame comprising a pair of side frames; a pair of inclined frames connected to front ends of the side frames, respectively, such that a distance therebetween decreases toward the front; a front frame connected to the inclined frames; and a rear frame configured to connect rear ends of the side frames;
a battery disposed between the pair of side frames; and
a wire assembly connected to the side frame and the battery, and being configured to contain a wire in an internal space thereof.

12. The chassis frame module of claim 11, wherein the wire assembly comprises:
a wire cage having one side connected to the side frame and the other side connected to the battery; and
a clip mounted in the wire cage, such that the wire is seated thereon.

13. The chassis frame module of claim 12, wherein the clip is detachably mounted on the wire cage.

14. The chassis frame module of claim 13, wherein the clip comprises:
a clip insertion part mounted on the wire cage;
a clip rod part extended from one side of the clip insertion part;
a contact surface part mounted at an end of the clip rod part, and being in contact with the wire cage; and
an elastic coupling part formed on one side of the contact surface part, having a ring shape with an open side, and being elastically coupled to the wire.

15. The chassis frame module of claim 14, wherein the clip insertion part is formed in an arrowhead shape whose size gradually decreases in an insertion direction to the wire cage, and being made of an elastically deformable material.

16. The chassis frame module of claim 12, wherein the wire cage comprises:
a wire body having one side connected to the side frame and the other side connected to the battery; and having an internal space formed therein; and
a grid part mounted in the internal space of the cage body, formed in a grid shape, and configured to divide a space in which the plurality of clips are mounted.

17. The chassis frame module of claim 16, wherein the wire cage further comprises a plurality of open observation windows formed in the cage body along the length of the cage body.

18. The chassis frame module of claim 12, wherein the wire cage is made of a plastic material.

19. A chassis frame module for an electric vehicle, comprising:
a chassis frame comprising
a pair of side frames;
a pair of inclined frames connected to front ends of the respective side frames, respectively, and a distance between the pair of inclined frames decreases toward the front;
a front frame connected to the inclined frames; and
a rear frame connected to rear ends of the pair of side frames;
a battery disposed between the pair of side frames; and
a plurality of modularized wire assemblies, applicable to a multiple different types of side frames, disposed between the side frame and the battery, and being configured to house a wire in an internal space thereof.

* * * * *